United States Patent [19]

Schmanski

[11] Patent Number: 5,290,833
[45] Date of Patent: Mar. 1, 1994

[54] AGGREGATE OF ASPHALT AND FILLER

[75] Inventor: Donald W. Schmanski, Carson City, Nev.

[73] Assignee: Carsonite International Corporation, Carson City, Nev.

[21] Appl. No.: 908,220

[22] Filed: Jul. 1, 1992

[51] Int. Cl.$^5$ .................... C08F 45/02; C08L 7/00; C08L 95/00

[52] U.S. Cl. .................... 524/71; 524/59; 524/70; 524/62; 521/41; 521/48; 523/172

[58] Field of Search .................... 524/59, 70, 71, 62

[56] References Cited

U.S. PATENT DOCUMENTS

| | | |
|---|---|---|
| 3,253,521 | 5/1966 | Endres et al. |
| 3,567,660 | 3/1971 | Winkler |
| 3,707,901 | 1/1973 | Bynum, Jr. et al. |
| 3,849,355 | 11/1979 | Yamaguchi et al. ........... 524/71 |
| 3,850,537 | 11/1974 | Bynum, Jr. |
| 4,068,023 | 1/1978 | Nielsen et al. ........... 524/62 |
| 4,166,049 | 8/1979 | Huff ........... 524/62 |
| 4,358,320 | 11/1982 | Marzocchi et al. ........... 428/378 |
| 4,485,201 | 11/1984 | Davis ........... 524/68 |
| 4,548,962 | 10/1985 | Lindmark ........... 524/71 |

*Primary Examiner*—Paul R. Michl
*Assistant Examiner*—Olga Asinovsky
*Attorney, Agent, or Firm*—Thorpe, North & Western

[57] ABSTRACT

An asphalt pavement material comprising an aggregate mixture of asphalt, gravel, sand and a pelletized composite of recycled rubber and thermoplastic material. The pelletized composite has a uniform size, smaller than the gravel and larger than the sand and is configured to fit within interstitial voids between the gravel. Sufficient pelletized composite is added to the asphalt pavement and mineral aggregate mixture (replacing mineral aggregate of comparable size) to substantially fill void spaces between the gravel.

4 Claims, 2 Drawing Sheets

AGGREGATE OF ASPHALT AND FILLER

BACKGROUND OF THE INVENTION

1. Field of Invention

This invention relates to an aggregate of sand, gravel and asphalt useful for road base or repair material. More particularly, the present invention pertains to compositions of asphalt with aggregate, which further include recycled tire materials and thermoplastics.

2. Prior Art

The challenge of preparing a road surface which is capable of weathering extreme variations in temperature has been and remains formidable. When one considers the fact that ranges in temperature in typical environments can traverse 100 degrees centigrade, with the attendant expansion and freezing of water, it is not surprising that road repair is a major budget item for virtually every state.

Black top or asphalt road base is particularly vulnerable because of the tendency for poor compaction between particles of aggregate. This occurs in part because the nonuniform size and shape of gravel aggregate leaves spaces between aggregate particles which do not totally fill with sand or asphalt binder. Additionally, the intermediate aggregate which functions to fill in spaces between gravel may be nonuniform in size, thereby frustrating good compaction. Water is therefore able to seep into these areas, and upon freezing, expand to open cracks and gaps in the material. The process then repeats itself, further enlarging the cracks and fissures until fragments of pavement break away, leaving pot holes and other road damage.

Recent awareness for the need to recycle discarded tires has prompted their use as an additional composite element to the asphalt aggregate combination. This element comprises shredded tire which is softened or dissolved and serves as a binder with the bitumen component. Examples of this technology are disclosed in U.S. Pat. Nos. 3,253,521; 3,567,660; and 4,166,049. These references teach the benefit of recycling tire material within a road base, but don't indicate any strong advantage associated with prevention of weathering of the road material. The introduction of shredded tire material within the asphalt composite functions more as an ecological solution for disposition of worthless tires, rather than as part of a solution to improve the road base.

Another application of discarded tires has developed in connection with preparation of an intermediate layer which is designed to provide a resilient function to limit damage to the top layer of asphalt composite. This intermediate layer is typically formed of tire material supported in sand. There is no significant relationship of the tire with the bitumen material in these references, which are represented by U.S. Pat. Nos. 3,707,901 and 3,850,537.

U.S. Pat. No. 4,358,320 illustrates another aspect of asphalt with aggregate in which the bitumen is used to enhance adhesive bonding of silicone or fiber reinforcement as part of a composite. In this instance, the structure of the aggregate is not at issue. Instead, the problem being solved relates to strengthening existing bonding between the filler and bitumen. It does not relate to compaction.

Despite the numerous attempts to find a useful approach for disposing of the millions of pounds of scrape rubber generated by the tire industry, the problem is simply compounding. Ecological concerns are increasing pressure on governments to deal with this disposal problem. This is also true with the increasing use of plastics which are non-biodegradable and have long been recognized as a landfill problem. Nevertheless, a practical solution must include development of a range of benefits that provide financial return, as well logical justification to go to the expense necessary to implement constructive use of recycled tire product in large scale.

The urgency of this problem has prompted the US Government to pass laws in 1991 requiring that at least 5% of the asphalt road composite comprise recycled tire material. This injunction mandating use of tire rubber will undoubtedly enhance commercial interest in techniques for combining these materials, but will not ensure an improved road structure. The fact that in 1966 U.S. Pat. No. 3,253,521 issued teaching multiple techniques for combining asphalt and tire material as a paving composition, evidences that the solution to an effective composition is not a simple matter. If incorporating tire material within asphalt were merely a step of stirring it in, the past 26 years would have seen greater acceptance. The existence of a law requiring this use of tire with asphalt confirms that prior art commercial procedures have failed to develop a product which is an improvement over other prior art paving compositions.

It is interesting to note that the 1966 patent identified the significant issues in preparing this asphalt composite to include the proper selection of particle size for the aggregate and tire scrap. Column 3, lines 18-29 suggest that the rubber particles should have a range of sizes extending from screen size 4 through 80 or 0.01 to 0.25 inches. The range of sizes was suggested to ensure that voids within the paving material would be minimized. This material was then to be formed into blocks which could be laid as a paving composition.

This reference did not contemplate use with mineral aggregate, but appears to be concentrating on the development of a new form of paving composition which is primarily formed of the rubberized bitumen and particulated rubber. This appears to be true generally with the other cited patents, in that they emphasize the formation of a composition which is as much as 20 to 60% rubber composition (U.S. Pat. No. 4,166,049). U.S. Pat. No. 3,707,901 suggests as much as 30 to 60% (volume) vulcanized rubber with an equal amount of mineral aggregate. Clearly, the emphasis has been to load the asphalt paving composition with as much tire material as can be chemically introduced while maintaining acceptable physical properties. Experience suggests that the physical performance of these compositions did not prove adequate. Deformation under heat with subsequent formation of waves in the road surface occurred where excessive organic binder becomes too flowable, perhaps because of the high rubber content. Weatherability of the prior art composites remains a problem.

What is needed, therefore, is a form of paving material which preserves the desirable properties of an asphalt aggregate without compromising those properties for the sake of resolving the ecological problem of scrap tires.

OBJECTS AND SUMMARY OF THE INVENTION

It is an object of the present invention to provide an improved composite road material of asphalt, aggregate and tire material which not only provides a practical disposition of scrap rubber, but also provides enhanced performance of the road material against weathering.

It is a further object of this invention to utilize existing recycled tires and thermoplastic packaging material to develop a paving material which is equivalent with conventional asphalt paving.

An additional object of this invention is to provide an asphalt composite paving material which has improved compaction characteristics.

These and other objects are realized in an asphalt pavement material comprising an aggregate mixture of asphalt, gravel, sand and a pelletized composite of recycled rubber and thermoplastic material. This pelletized composite has a uniform size smaller than the gravel and larger than the sand and is configured to fit within interstitial voids between the gravel. The pelletized composite has a percentage composition corresponding to total void space to be filled by the pelletized composite and cooperates with the sand to fill the interstitial voids to provide acceptable compaction.

This material is the product of a method for preparing an asphalt paving material comprising the steps of:

reducing recycled rubber to rubber particles having a size within the range of −16 to +6 mesh;

combining the rubber particles with flowable polymer binder to form an uncured composite having from 30% to 50% (w) rubber content with 70% to 50% binder;

extruding the composite to form pellets having a size suitable for at least partially filling interstitial voids between gravel particles within the pavement material; and mixing sufficient pellets with asphalt, gravel particles and sand to form a substantially uniform aggregate suspension wherein the pellets migrate with smaller sand particles into the interstitial voids between the gravel particles to form a compactable pavement material which is stable in heat and weatherable in cold environments.

Other objects and features of the present invention will be apparent to those of ordinary skill in the art, based on the following detailed description, taken in combination with the accompanying drawings.

DETAILED DESCRIPTION OF THE INVENTION

The preparation of an asphalt composition which meets the criteria of heat stability, weatherability and incorporation of at least 5% scrap tire material begins with a shift away from the traditional strategies. Rather than merely looking at how much scrap rubber can be loaded into asphalt or other binder, the present invention adopts the philosophy of using just enough recycled rubber to fill up to 50% of the voids existing between gravel particles. This enables actual improvement of the product, by supplying a deformable material which positions itself at the void spaces between the particles of gravel and is able to spread under pressure to fill the void in combination with smaller sand particles.

Figure 1:
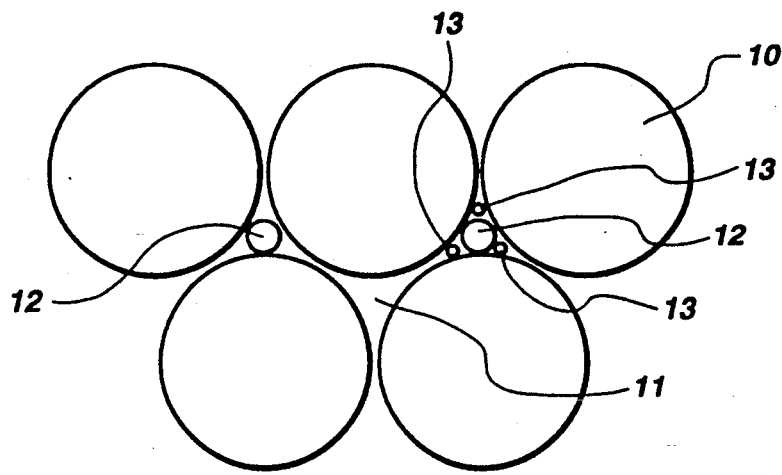
FIG. 1 graphically illustrates an arrangement of gravel with interstitial voids being partially filled by sand and pellets in accordance with the present invention.

FIG. 1 illustrates in graphic cross-section an array of particles including larger gravel 10, whose close spacing leaves small void pockets or spaces 11. In conventional asphalt paving material, this pocket is filled with smaller, median sized gravel which is sized to fill the space, in combination with sand. The asphalt binder provides adhesive between all these particles and fills remaining spaces to the extent possible by mere flowability.

The present invention provides a modified asphalt pavement material wherein an aggregate mixture of asphalt, gravel, and sand has a portion of the median sized gravel removed. This median sized gravel is replaced with pelletized composite 12 of recycled rubber and thermoplastic material. These particles of pelletized composite have a uniform size within a range of sizes smaller than the gravel and larger than the sand configured to fit within interstitial voids between the gravel. Obviously, this range of sizes will depend on the size of the gravel and its associated interstitial spacing.

Conventional aggregate mixtures of particular mineral material are represented by the following ranges of size and percentage of total mineral aggregate.

TABLE 1

HIGHWAY AGGREGATE MIX ½ INCH MAXIMUM

| AGGREGATE SIZE IN INCHES | PERCENTAGE |
| --- | --- |
| Greater than 0.50 | 0 |
| 0.375–0.500 | 0–4 |
| 0.187–0.375 | 17–21 |
| 0.0937–0.187 | 20–25 |
| 0.0234–0.0937 | 28–36 |
| 0.0029–0.0234 | 20–26 |
| Less than 0.0029 | 3–9 |

TABLE 2

HIGHWAY AGGREGATE MIX NO 4 MAXIMUM

| AGGREGATE SIZE IN INCHES | PERCENTAGE |
| --- | --- |
| Greater than 0.375 | 0 |
| 0.187–0.375 | 0–4 |
| 0.0937–0.187 | 20–25 |
| 0.0234–0.0937 | 35–45 |
| 0.0029–0.0234 | 30–40 |
| Less than 0.0029 | 2–12 |

TABLE 3

TYPICAL HIGHWAY AGGREGATE MIX OPEN GRADE

| AGGREGATE SIZE IN INCHES | PERCENTAGE |
| --- | --- |
| Greater than ¾ | 0 |
| 0.500–0.750 | 0–4 |
| 0.375–0.500 | 7–19 |
| 0.187–0.375 | 38–54 |
| 0.0937–0.187 | 18–28 |
| 0.0469–0.0937 | 4–16 |
| 0.0029–0.0469 | 0–8 |
| Less than 0.0029 | 0–2 |

TABLE 4

TYPICAL HIGHWAY AGGREGATE MIX ⅜ INCH MAXIMUM

| AGGREGATE SIZE IN INCHES | PERCENTAGE |
| --- | --- |
| Greater than 1 inch | 0 |
| 0.750–1.00 | 0–5 |
| 0.375–0.750 | 10–30 |
| 0.187–0.375 | 20–30 |
| 0.0937–0.187 | 15–25 |
| 0.123–0.0927 | 17–22 |
| 0.0234–0.0239 | 8–15 |
| Less than 0.0029 | 1–5 |

TABLE 5

HIGHWAY AGGREGATE MIX ½ INCH MAXIMUM

| AGGREGATE SIZE IN INCHES | PERCENTAGE |
| --- | --- |
| Greater than ½ | 0 |
| 0.50–0.750 | 0–5 |
| 0.375–0.500 | 5–15 |
| 0.187–0.375 | 15–30 |
| 0.0937–0.187 | 20–25 |
| 0.0234–0.0937 | 20–25 |
| 0.0029–0.0234 | 10–15 |
| Less than 0.0029 | 2–5 |

The median sized gravel has been underlined for identification, and constitutes that portion of the aggregate that migrates to the interstitial spaces for improved compaction.

In the present invention, a portion of this median sized gravel is substituted with the pelletized composite 12. Because of its common size within the identified median ranges, the pelletized composite likewise migrates to the interstitial spaces 11. There it cooperates with smaller sand 13 particles to substantially fill the void space and improve compaction of the paving material.

For example, Table 1 shows a ⅜ Inch Maximum aggregate. The median sized gravel is identified as 0.0937 to 0.147 inches. This range of particle comprises 20 to 25 percent by volume of the total aggregate mixture. Applying the present invention to this specific mixture would substitute up to 50%, and preferably from 15 to 30% of the pelletized composite for the mineral particles within the median range. This percentage substitution maintains acceptable mechanical interface and locking in place of this organic aggregate of pelletized composite without affecting the visco-elastic properties of the asphalt binder.

Because the content of asphalt binder is low (5 to 7%) in the aggregate mix, the pelletized composite has a major influence on the visco-elastic characteristics of the asphalt. For example, if the substituted pelletized composite is 30% of the mean 22.5% of median sized aggregate as represented in Table 1, then the pelletized composite comprises approximately 7% of the total aggregate mixture. If the composite comprises 50% recycled rubber, the approximately 3.5% of the paving composition is rubber, as compared with 5 to 7% asphalt. Note that the combined composite with the thermoplastic content is approximately equal to the total asphalt content. Therefore, the visco-elastic characteristics of the end product are directly affected by the composite.

The same calculations can be applied to the aggregate mixtures of Tables 2–5 to determine the relative percentages of tire and thermoplastic to asphalt. In Table 2, the numbers are substantially the same. The aggregate mixture of Table 3 has a higher percentage of median sized component at 18 to 28%. Accordingly, the pelletized composite will likewise have a higher percentage content. Table 4 discloses the broadest range of median gravel at 15 to 25%, whereas Table 5 is common with the earlier aggregate mixtures.

The specific amount of substituted pelletized composite will vary with desired properties of the paving material. A general guideline is that the pelletized composite has a percentage composition corresponding to total void space to be filled by the pelletized composite. Therefore, the combined median range of gravel and the total pelletized composite will generally equal the total median aggregate shown in the referenced tables 1–5. In all instances, the pelletized composite cooperates with the sand to fill the interstitial voids to provide acceptable compaction.

Figure 2:
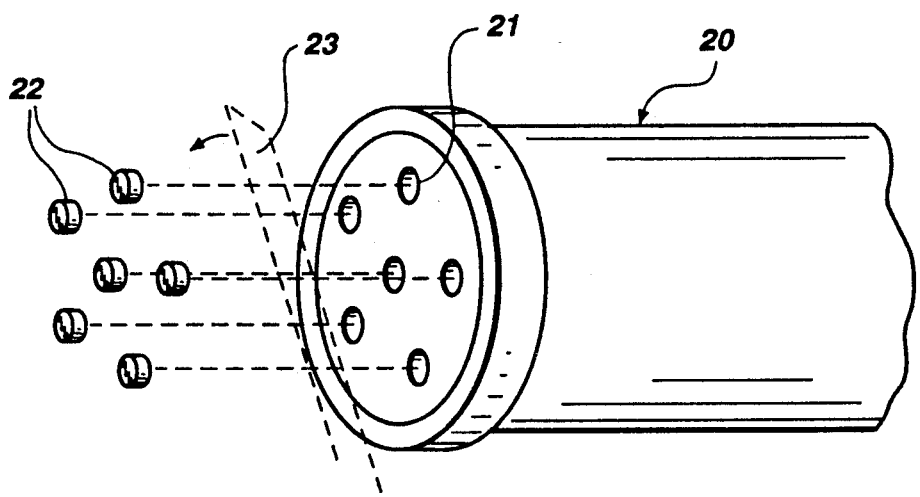
FIG. 2 graphically portrays an extrusion process for forming pelletized composite particles.

A significant feature of the present invention is the uniformity in size of the pelletized composite. This is readily accomplished by preparing the pellets by extrusion. This process is illustrated in FIG. 2, wherein an extrusion device 20 has a plurality of outlet ports 21 representing die openings for forming the pellet material 22. A cutting blade 23 shears the extruded material at uniform length, providing common size to the pelletized composite. This process is considered a significant deviation from prior art techniques which merely shredded the tire materials into small pieces which were directly introduced into the asphalt component.

An additional advantage of the present invention is the use of recycled thermoplastic materials as part of the pelletized composite. With the incredible volume of plastics being dumped into the land fills, incorporation of large quantities of such plastics can now be loaded in the paving material combined with recycled rubber. Because these two recycled materials are extruded into single pellets, the performance of this product is convenient and predictable. In addition to using thermoplastics, the present formulation has been shown to be effective with phenolic compositions, either in combination with thermoplastics, as well as the single binder.

Although variations in polymer composition may occur, the importance of pellet size remains significant. In its broad sense, the size of the pelletized composite is approximately within the range of 0.05 inches to 0.5 inches. This particularly applies where the aggregate mixture includes a mineral mix of particles ranging in size from 0.001 to 0.750 inches, said pelletized composite having a size within a preferred range of 0.09 to 0.20 inches. In the most preferred embodiments of this invention as suggested in Tables 1–5, the pelletized composite has a size within the range of approximately 0.0937 inches to approximately 0.187 inches.

Figure 3:
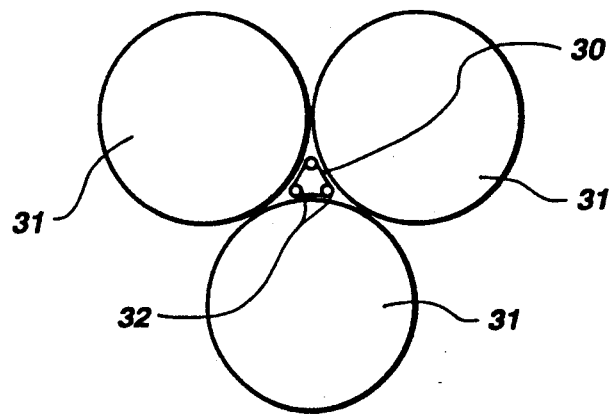
FIG. 3 depicts deformation of the pelletized composite within the general matrix.

FIG. 3 discloses the effect of heat and pressure on the pelletized composite. In contrast with the conventional mineral aggregate mixture which has no deformation, the present invention permits greater compaction. This occurs as the pelletized composite is subjected to heat and pressure, such is applied during road paving operations. Specifically, the pellet shape is deformed 30 to fill the remaining void space between the larger particles of gravel 31. This composite deforms within this void and engulfs trapped sand particles 32 or other smaller particles within this same space. The results of the spreading out of the composite within occupied interstitial voids significantly improves compaction of the pavement material and further reduce void structure available for weather degradation.

Figure 4:
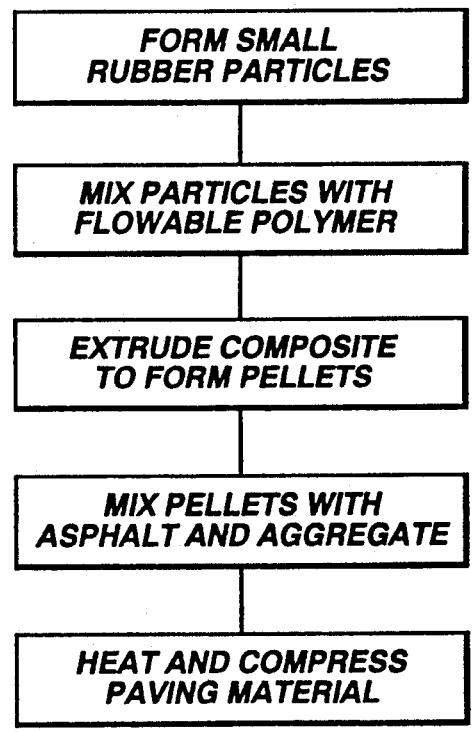
FIG. 4 shows a block diagram of the steps of preparation of the subject paving material.

These various embodiments are accomplished by applying the following general method for preparing an asphalt paving material from asphalt, gravel and sand. This method is set forth in FIG. 4 and comprises the steps of:

a) reducing recycled rubber to rubber particles having a size within the range of −16 to +6 mesh;

b) combining the rubber particles with flowable polymer binder to form an uncured composite having from 30% to 50% (w) rubber content with 70% to 50% binder;

c) extruding the composite to form pellets having a size suitable for at least partially filling interstitial voids between gravel particles within the pavement material; and d) mixing sufficient pellets with asphalt, gravel particles and sand to form a substantially uniform aggregate suspension wherein the pellets migrate with smaller sand particles into the interstitial voids between the gravel particles to form a compactable pavement material which is stable in heat and weatherable in cold environments.

The method also comprises the steps of (i) heating the paving material to a temperature wherein the pellets become deformable under pressure and (ii) compressing the material to deform the pellets to fill remaining void space within the interstitial voids between the gravel particles.

It is to be understood that the foregoing description of preferred embodiments is given for example, and is not to be limiting except as set forth in the following claims.

I claim:

1. A method for preparing an asphalt paving material from asphalt, gravel and sand, said method comprising the steps of:

a) reducing recycled rubber to rubber particles having a size within the range of −16 to +6 mesh;

b) combining the rubber particles with flowable polymer binder to form an uncured composite having from 30% to 50% (w) rubber content with 70% to 50% (w) binder;

c) extruding the composite to form pellets having a size suitable for at least partially filling interstitial voids between gravel particles within the pavement material; and d) mixing sufficient pellets with asphalt, gravel particles and sand to form a substantially uniform aggregate suspension wherein the pellets migrate with smaller sand particles into the interstitial voids between the gravel particles to form a compactable pavement material which is stable in heat and weatherable in cold environments.

2. A method as defined in claim 1, further comprising the steps of (i) heating the paving material to a temperature wherein the pellets become deformable under pressure and (ii) compressing the material to deform the pellets to fill remaining void space within the interstitial voids between the gravel particles.

3. A method as defined in claim 1, wherein the combining step comprises adding recycled thermoplastic polymer as the polymer binder.

4. A method as defined in claim 1, wherein the combining step comprises adding a phenolic composition as the polymer binder.

* * * * *